March 4, 1952  E. W. HOUGHTON  2,588,240
PULSING CIRCUIT

Filed March 27, 1946  2 SHEETS—SHEET 1

INVENTOR
E. W. HOUGHTON
BY
H. O. Wright
ATTORNEY

March 4, 1952 E. W. HOUGHTON 2,588,240
PULSING CIRCUIT

Filed March 27, 1946 2 SHEETS—SHEET 2

INVENTOR
E. W. HOUGHTON
BY H. O. Wright
ATTORNEY

Patented Mar. 4, 1952

2,588,240

UNITED STATES PATENT OFFICE 2,588,240

PULSING CIRCUIT

Edward W. Houghton, Chatham, N. J., assignor to Bell Telephone Laboratories, Incorporated, New York, N. Y., a corporation of New York Application March 27, 1946, Serial No. 657,400

4 Claims. (Cl. 250—36)

This invention relates to ultra-high frequency generators. More particularly it relates to a simple type of circuit arranged to provide either continuous wave ultra-high frequency energy or constant frequency or variable frequency pulses of ultra-high frequency energy and of discrete time duration and spacing.

In more detail the circuits of the invention are of the type in which ultra-high frequency energy is generated by an oscillatory circuit controlled by a circuit, the latter circuit providing control signals which can activate the oscillatory circuit to emit either continuous wave energy or constant frequency or variable frequency pulses.

An object of the invention is to provide a simple source of ultra-high frequency which will provide either continuous wave energy or a series of accurately timed pulses of substantially constant frequency or a series of accurately timed pulses which will vary in frequency over a predetermined range of frequencies for each pulse.

Another object of the invention is to provide compact and convenient equipment for testing purposes, and the like, which will readily provide several distinctly different types of ultra-high frequency energy.

Other and further objects will become apparent from the following description and from the appended claims.

The principles of the invention will be more readily understood from the description of a particular illustrative embodiment given below in conjunction with the accompanying drawings in which.

Figure 1:
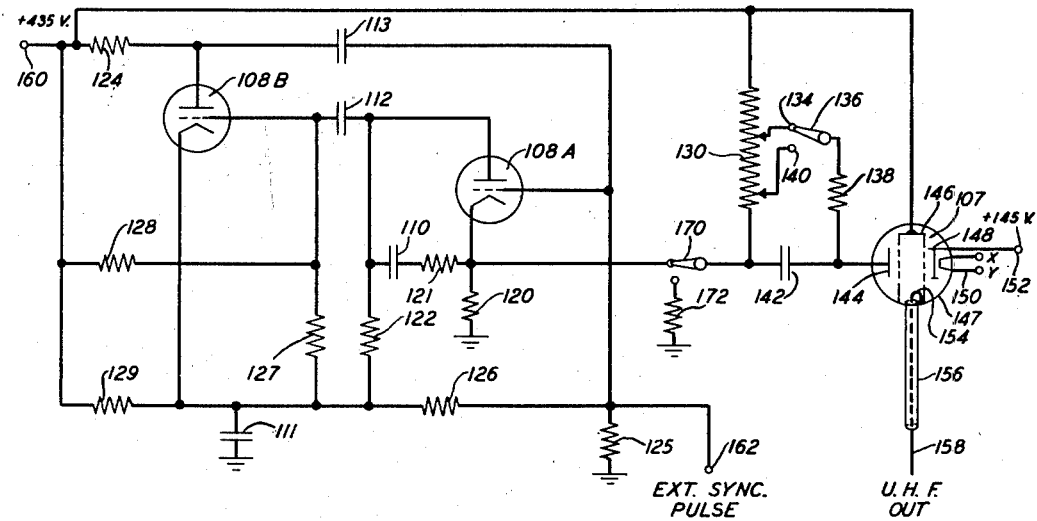
Fig. 1 shows, in electrical schematic diagram form, an illustrative circuit of the invention, including an ultra-high frequency oscillator and a control circuit for the oscillator.

In more details, in Fig. 1 the circuit including the two triode vacuum tubes 108A and 108B constitutes a special form of timing circuit of the type known generally as a multivibrator. The nature and operation of the special multivibrator circuit will be more readily understood from the discussion hereinafter of the simplified schematic circuits shown in Figs. 1A and 1B. The arrangement and specific parameters of this particular circuit have been selected to provide advantageous operation in conjunction with the velocity variation type of vacuum tube oscillator most conveniently applicable for the purposes of this invention. Obviously, different arrangements and parameters can readily be devised by those skilled in the art for other specific applications of various principles of the invention without departing from the spirit and scope of the invention.

The multivibrator circuit (including vacuum tubes 108A and 108B) of Fig. 1 is preferably of the self-oscillating type, that is, in the absence of an external blocking or synchronizing pulse which can be applied to terminal 162, as will be described below, it will continuously repeat its normal cycle. Triode 108A will, for example, be alternately conducting for six microseconds and substantially non-conducting for two microseconds. The circuit elements controlling this cycle will be identified specifically hereinafter. Triode 108B will, of course, be conducting while triode 108A is substantially non-conducting and vice versa.

Figure 1A:
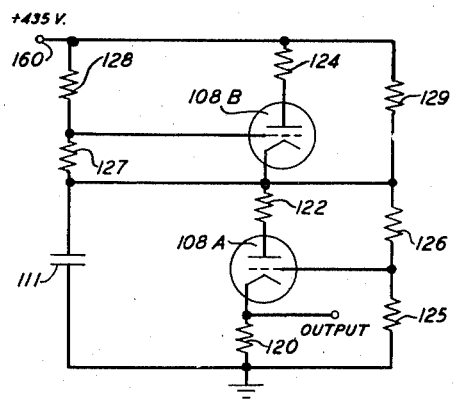
Figs. 1A and 1B show fragmentary and simplified circuit schematics relating to the control circuit of Fig. 1 and employed in explaining its nature.

As redrawn in part and rearranged in Fig. 1A it is apparent that vacuum tubes 108A and 108B are connected electrically in series with the 435-volt direct current supply. The voltage of this supply is dictated by the operating requirements of the velocity variation oscillator vacuum tube 107 and is substantially double that which would normally be used with a conventional multivibrator circuit in which the component vacuum tubes are connected electrically in parallel with the direct current supply. The series arrangement of these tubes 108A and 108B employed in Fig. 1 offers economies both in current drawn from the supply and in the cost of the circuit elements required as compared with the straightforward use of a voltage divider such as would permit the tubes of the multivibrator circuit to be operated electrically in parallel in the conventional manner.

The alternating current operation of the multivibrator circuit of Fig. 1 is, however, the full equivalent of a conventional multivibrator as will become apparent from the detailed description hereinunder.

Capacity 111 of Figs. 1 and 1A is employed to provide an effective alternating current "ground" on the cathode of vacuum tube 108B.

In the normal operation of the circuit of Fig. 1 vacuum tube 108A requires more plate circuit current than that of vacuum tube 108B. This additional current is supplied through resistor 129.

Resistors 127 and 128 form a voltage divider for obtaining a suitable positive bias voltage for the grid of tube 108B. Resistors 125 and 126 perform a similar function for the grid of tube 108A. Since the grid circuit currents are negligible these resistors can obviously be of large values and will carry only very small currents and therefore dissipate a negligible amount of power. These voltage dividers and the single plate voltage supply of Figs. 1 and 1A could, of course, be replaced by any other suitable sources of appropriate potential such for example as simple batteries, so that the multivibrator circuit of Fig. 1, including vaccum tubes 108A and 108B, can be represented as the equivalent of the form shown in Fig. 1B, where the above-mentioned voltage dividers are, in effect, replaced by grid bias batteries $g_1$ and $g_2$ and the plates of vacuum tubes 108A and 108B are connected to separate plate potential supplies indicated by the designation $+B_2$ and $+B_1$, respectively. Suitable values of voltage, by way of example, for these batteries are approximately 40 volts each for $g_1$ and $g_2$ and 210 volts each for $B_1$ and $B_2$, respectively.

Figure 1B:
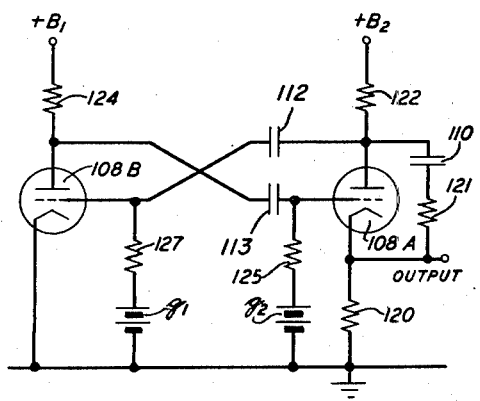

From Fig. 1B it is apparent that the circuit, including vacuum tubes 108A and 108B of Fig. 1 is, from the standpoint of alterating current operation, substantially the equivalent of a conventional multivibrator circuit. Obviously, the RC combination comprising resistor 127 and condenser 112 determines the cut-off interval of tube 108B, since the charge on condenser 112 must leak off through the circuit including resistors 127 and 120, grid bias battery $g_1$ and vacuum tube 108A (conducting) before the grid of vacuum tube 108B can become sufficiently positive to permit vacuum tube 108B to become conducting.

Likewise, the RC combination comprising resistor 125 and condenser 113 determines the cut-off interval of tube 108A, since the charge on condenser 113 must leak off through the circuit including resistor 125, grid bias battery $g_2$ and vacuum tube 108B (conducting) before the grid of vacuum tube 108A can become sufficiently positive to permit vacuum tube 108A to become conducting.

The grid bias batteries $g_1$ and $g_2$ of Fig. 1B or the corresponding voltage dividers of Fig. 1, as described above, provide positive bias on the grids of vacuum tubes 108B and 108A, respectively, for the purpose of increasing the magnitude of the alternating currents in these vacuum tubes which increases the output pulse voltage across resistor 120 to a suitable magnitude. Also the time rate of change of pulse voltages in the grid circuits is thereby increased which causes more accurate timing of the pulse repetition cycle.

The output voltage wave of the multivibrator circuit, (including the vacuum tubes 108A and 108B) is taken from the cathode resistor 120 as indicated in Figs. 1, 1A and 1B. This voltage wave has the form illustrated in Fig. 3. Since with convenient circuit parameters vacuum tube 108A is not completely cut off during its (substantially) non-conducting period, a small residual voltage is developed across resistor 120, which moreover, varies somewhat during the (substantially) non-conducting period. By adding the compensating network comprising capacity 110 and resistor 121, connecting the anode and cathode of vacuum tube 108A as shown in Figs. 1 and 1B, an oppositely varying small voltage is added across resistor 120, so that the resulting total voltage across resistor 120 during the (substantially) non-conducting intervals of vacuum tube 108A, while not zero, is maintained at the virtually constant and small value indicated by line 300 in Fig. 3. During the substantially non-conducting intervals of vacuum tube 108A, therefore, the voltage wave across resistor 120 is represented by the portions 310 as indicated in Fig. 3.

Figure 3:
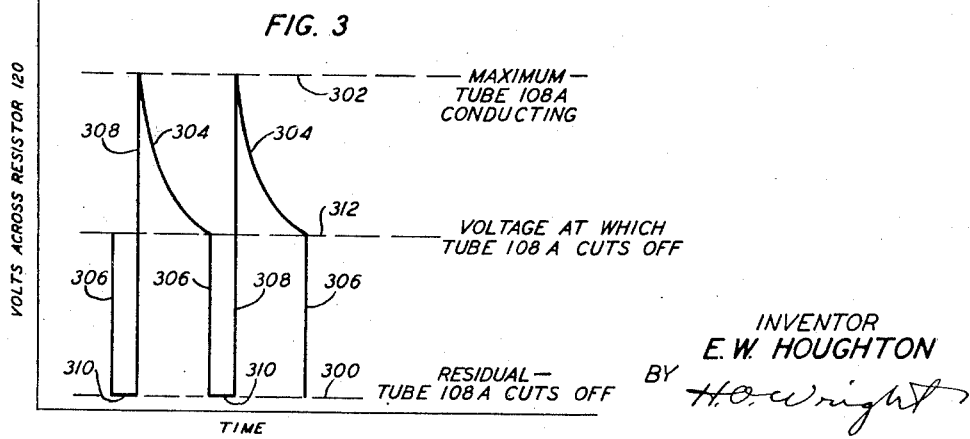
Fig. 3 illustrates the form of control voltage wave provided by the control circuit (including vacuum tubes 108A and 108B).

When vacuum tube 108A becomes conducting, following an interval in which it is non-conducting, the voltage across resistor 120 rises substantially instantaneously to the maximum value represented by line 302 of Fig. 3, the voltage rise being represented by line 308. Immediately condenser 113 starts charging and condenser 112 starts discharging as described above, the net result being at first a gradual decrease of current through vacuum tube 108A accompanied by a like gradual decrease of the voltage across cathode resistor 120, as indicated by portion 304 of the voltage wave of Fig. 3, until a critical voltage indicated by line 312 of Fig. 3 is reached, at which point vacuum tube 108B becomes conducting and vacuum tube 108A becomes instantly substantially non-conducting and the voltage across resistor 120 immediately drops again to the low residual value represented by line 300 of Fig. 3. Condenser 113 then starts discharging and condenser 112 starts charging until vacuum tube 108A again becomes suddenly conducting and the cycle just described above is repeated. As stated above, the length of the conducting and non-conducting intervals of the two vacuum tubes 108-A and 108-B, are, within appreciably wide limits, determinable by the values assigned to the coupling elements, namely capacitors 112 and 113 and the resistors 125 and 127, as is well known to those skilled in the art.

This type of multivibrator is commonly designated "unsymmetrical" since the wave generated by it is, obviously, not symmetrical. Any of numerous conventional multivibrator circuits can readily be adapted in accordance with the principles of the invention, to be employed in circuits of the invention as will become apparent hereinunder. By way of example, reference may be had to United States Patents 2,002,969 issued December 3, 1935 to L. A. Meacham; 2,157,533, issued May 9, 1939 to M. Geiger; 2,237,668 issued April 8, 1941 to D. Herman and many others.

Figure 2:
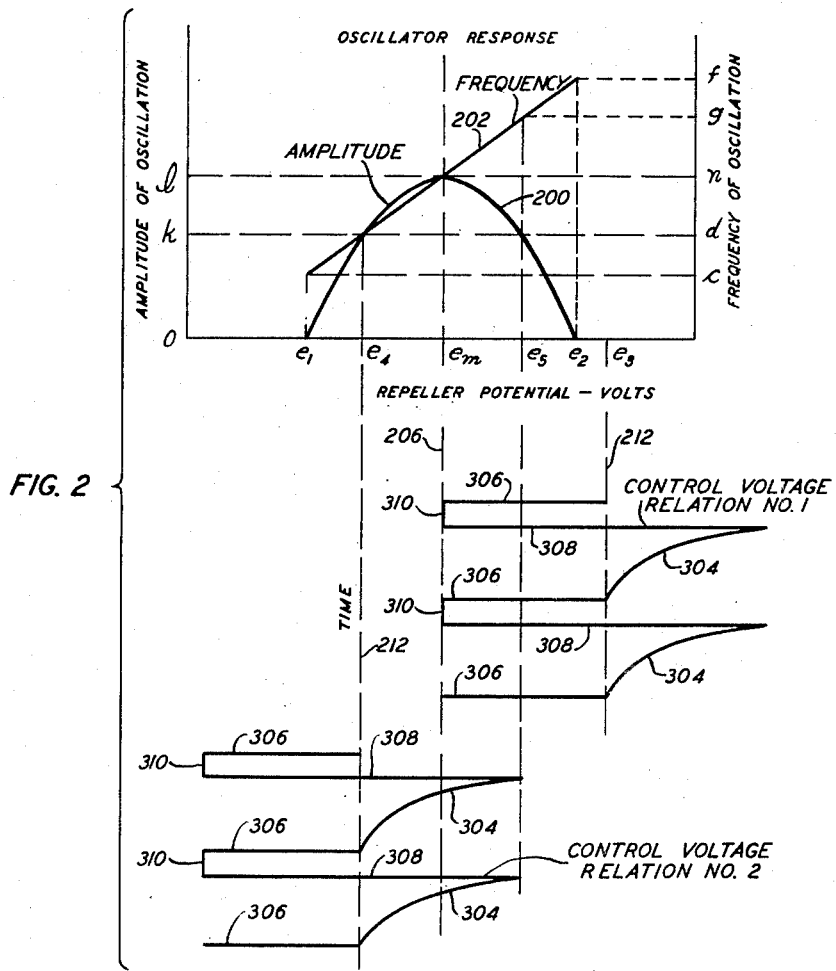
Fig. 2 shows, in diagrammatic form, two possible voltage relations between the timing or control and the oscillatory circuits and illustrates the resulting responses of the ultra-high frequency oscillatory circuit for the two voltage relationships illustrated.

The remaining portion of the circuit of Fig. 1, i. e., that including vacuum tube 107, is an ultra-high frequency oscillatory circuit, the essential element of which is the vacuum tube 107. The vacuum tube 107 is of the velocity variation type now well known to those skilled in the art, and is preferably one of the Western Electric Company, incorporated tubes manufactured under the codes 2K22, 2K23, 2K25, 2K50 and many others. Alternately it can be, for example, of the variety described in connection with Fig. 1 of the copending application of J. R. Pierce, Serial Number 388,043, filed April 11, 1941 and assigned to applicant's assignee, which application matured into United States Patent 2,406,850 granted September 3, 1946, or it can be substantially as shown in Fig. 2 of United States Patent 2,250,511 issued July 29, 1941 to R. H. Varian et al.

Tube 107 comprises an electron gun structure 148, which includes at least a cathode, and a focussing element, a cathode heater 150, a grid and resonant cavity structure 146, a repeller electrode 144 and an output coupling loop 154 with an associated output coaxial line comprising outer conductor 156 and inner conductor 158. Except for the last-mentioned coaxial output line, the components of the tube are commonly enclosed within an evacuated envelope 147, with appropriate conducting members extending through the envelope to permit convenient electrical connection to the associated external electrical circuits and potential sources as required for normal operation.

In Fig. 1 the positive terminal of a 435-volt direct current source, is connected to terminal 160 and the positive terminal of a 145-volt direct current source is connected to terminal 152 for normal operation, the negative terminals of both these sources being grounded.

Potentiometer 130 connects between 435 volts positive and the ungrounded end of either cathode resistor 120 or the ungrounded end of resistor 172 depending upon the position of switch 170. Switch 136 permits connection to either terminal 134 or 140, as indicated, which terminals in turn connect to adjustable contactors near the center and lower end, respectively, of potentiometer 130 so that by throwing switch 136 to its upper or lower position one of two fixed bias potentials can be readily applied through resistor 138 to the repeller electrode 144 of tube 107. The reasons for this specific arrangement will become apparent hereunder in connection with the discussion of Fig. 2. Capacitor 142 provides a low alternating current impedance coupling between the output resistor 120 and the repeller 144. Resistor 138 serves to isolate the direct current potentiometer 130, and switch 134 from the alternating current circuit and thus to keep the direct current circuits from shunting the alternating current circuit.

An external or synchronizing pulse can be applied to terminal 162 to bring the pulsing operation of the multivibrator circuit into synchronism with some external source of pulses such as a radar transmitter. A negative pulse of approximately 100 volts is entirely adequate and when applied to terminal 162 it, of course, renders the control grid of tube 108A negative and tube 108A non-conducting. At the conclusion of the negative pulse applied to terminal 162 there is a ten-microsecond delay resulting from the disabling of the multivibrator. This interval is required for all voltages to return to reference values, whereupon the cultivibrator circuit starts to function normally as previously described.

Switch 170 provides for disconnecting the oscillator circuit from the pulsing circuit and substituting a resistor 172, suitable for continuous wave (or continuous oscillation) operation of tube 107. By choosing a suitable value for resistor 172 the voltage across it can be made equal to the voltage that exists across resistor 120 during the two-microsecond interval 310 when aligned with line 206 of Fig. 2. If these two voltages are made equal the oscillation frequency and peak power during this two-microsecond interval will be very nearly equal to the oscillation frequency and maximum continuous wave power, respectively. Also the peak amplitude of the variable frequency six-microsecond pulse will be substantially that obtaining for continuous wave operation and the power during the six-microsecond pulse will be a maximum and approach the value for continuous wave operation. It cannot fully reach this value for reasons which will become apparent hereunder. As a practical matter it is more convenient to make adjustments of the circuit and measure its power output under continuous wave operation so that the arrangement just described facilitates adjustment and calibration of the circuit.

Turning now to Fig. 2, curve 200 represents the amplitude variation of oscillation of tube 107 of Fig. 1 for a variation of repeller anode voltage between two values $e_1$ and $e_2$, the amplitude being zero at $e_1$, increasing to a maximum value at the median voltage $e_m$ and decreasing to zero again at voltage $e_2$. The voltages here referred to are the potentials effective on the repeller anode 144. They are increasingly positive from left to right. As is well known to those skilled in the art, there are several voltage ranges over which oscillation will occur substantially as described for the range from $e_1$ to $e_2$, with intervening voltage ranges at which no oscillation occurs. Obviously any desired oscillation range may be employed in accordance with this invention.

Inclined line 202 represents the change in the frequency of oscillation which takes place as the voltage of the repeller anode 144 is varied between $e_1$ and $e_2$. The frequency, as indicated at the right of curves 200, 202 varies from a value $c$ to a value $f$ during the change in voltage from $e_1$ to $e_2$. As stated in the above-mentioned copending application of Pierce, a variation of twenty to thirty megacycles can be obtained in this manner for a tube operating in the neighborhood of ten-centimeters wavelength (3,000 megacycles).

The potentiometer 130 serves to select suitable direct current bias voltages which can be added to the pulse voltages furnished by the multivibrator across resistor 120. Combinations of this nature are applied to the repeller electrode 144. The effects of these combinations are illustrated by Fig. 2 where the variable six-microsecond pulses are shown extending to the right and the constant amplitude two-microsecond pulses are shown extending to the left of the vertical mean voltage lines 212 which correspond to the dotted line 312 of Fig. 3 described above.

Each of the two positions for the pulse series, as illustrated in Fig. 2, represents the addition of the pulsing voltage of Fig. 3 to one of the two different constant bias voltages $e_3$ and $e_4$, the last-mentioned bias voltages being those selected by switch 136 when operated to contact terminals 134 or 140, respectively.

When a constant bias voltage $e_3$ (switch 136 on terminal 134) is effective, it is apparent that the amplitude of the oscillations is zero except for the two-microsecond intervals when the squared top pulses 310 cause the voltage of the repeller 144 to change to $e_m$. For these intervals the tube 107 oscillates at an amplitude $l$ and a frequency $n$ and, of course, produces two microsecond pulses with intervals of six-microseconds intervening in which no oscillation takes place.

When the constant bias voltage is changed to $e_4$, (switch 136 on terminal 140) the two microsecond positive pulses 310 then carry the voltage of the repeller electrode 144 to the left of voltage $e_1$ (more negative) and the oscillations are reduced to zero during the two-microsecond intervals. During the variable pulses 304, the voltage of repeller electrode 144 is varied between voltages $e_5$ and $e_4$ with a resulting variation of frequency from $g$ to $d$ and a variation in amplitude from the value $k$ through the maximum value $l$ and back to the value $k$. Tube 107 therefore produces six-microsecond pulses which vary continuously in frequency between the starting and end values, determined as above-described. The amplitude of oscillation also varies through a maximum at the mid-frequency $e_m$ as above-described, and as indicated in Fig. 2. The six-microsecond pulses, as noted above, are separated by two-microsecond intervals during which no oscillation takes places.

The adjustable contacts on potentiometer 130 associated with terminals 134 and 140, respectively, are preferably adjusted so that substantially the conditions illustrated in Fig. 2 are obtained, i. e., for terminal 134 adjustment is made for maximum amplitude of the two-microsecond pulses and for terminal 140 adjustment is made to center the frequency variation with respect to $e_m$ which is also indicated by a maximum average amplitude of output energy.

The switch 170 of Fig. 1, providing for continuous wave operation of the oscillator, by substituting resistor 172 for the pulsing circuit, not only provides a continuous wave when desired for testing purposes but also, as pointed out above, facilitates adjustment, since under continuous wave operation the adjustment of the circuit for maximum output is more readily accomplished. The duty cycle with the prescribed two-microsecond pulse operation (with six-microsecond inert intervals) is, obviously, 25 per cent, so that the power resulting after adjustment for maximum power should be one-quarter of the maximum obtained with continuous wave operation.

The above-described arrangements are illustrative of the principles of the invention, but numerous variants and equivalent arrangements can obviously be readily devised by those skilled in the art within the spirit and scope of the invention. For example, the timing circuit can be designed to provide squared top or variable pulses for both "positive" and "negative" pulse series and widely varying pulse widths and shapes can be readily provided.

Also, obviously, numerous other control circuits providing control waves having more than two series of control pulses at different voltage levels (see, for example, Figs. 4 and 7 of Patent 2,171,536 issued September 5, 1939 to F. J. Bingley) can be employed with appropriate adjustable biasing means to render any desired one of the series effective in controlling the oscillator, and can readily be devised by those skilled in the art.

What is claimed is:

1. An ultra-high frequency pulse generating system comprising an ultra-high frequency energy wave generating circuit including a velocity variation type oscillating vacuum tube having a repeller anode, and a predetermined anode voltage range within which, only, oscillation will take place, a pulse generating circuit comprising a multivibrator having an unsymmetrical voltage wave output consisting of a series of squared top pulses at one voltage level and intervening variably shaped pulses at another voltage level, the minimum difference in voltage level between said differently shaped pulses being at least one-half the said voltage range within which oscillation will take place, said multivibrator output being connected to said repeller anode, a source of constant voltage potential, a voltage dividing circuit connected to said source and switching means connecting said repeller anode to either of two points on said voltage dividing circuit, one of said points providing a first constant voltage bias on said repeller anode such that the oscillating vacuum tube is enabled only during the occurrence of said squared top pulses, the other of said points providing a second constant voltage bias on said repeller anode such that the oscillating vacuum tube is enabled only during the occurrence of said variably shaped pulses whereby either constant frequency or variable frequency ultra-high frequency pulses can be obtained from said ultra-high frequency pulse generating system.

2. An ultra-high frequency pulse generating system comprising an ultra-high frequency velocity variation electronic oscillator including a repeller anode, said oscillator being operable only within a predetermined anode voltage range, an unsymmetrical electrical pulse wave generator providing a cyclically varying voltage wave, the cyclical variation of said wave being at least one-half of said predetermined anode voltage range, the output of said pulse wave generator being connected to said repeller anode, means supplying two different amplitudes of constant voltage bias, switching means for connecting one or the other of the two different amplitudes of bias to said repeller anode, one amplitude bias rendering the oscillator operative during one portion of each complete cycle of the output wave from said generator, the other amplitude bias rendering the oscillator operative during another portion of the output wave from said generator whereby either of two different types of ultra-high frequency pulses can be obtained from said oscillator.

3. In a pulse generating system the combination which comprises an oscillator circuit employing a velocity modulated vacuum tube having a repeller electrode and a predetermined repeller electrode voltage range within which, only, oscillation will take place, a multivibrator circuit providing square wave pulses of one voltage level and varying pulses of another voltage level, the minimum difference in voltage level between said differently shaped pulses being at least one-half of said voltage range within which oscillation will take place, a source of direct current biasing voltage and means for adjusting the effective voltage of said source, the output of said multivibrator circuit and the said adjusting means of said source of bias being connected to said repeller electrode whereby for one adjustment of said adjusting means said oscillator circuit is controlled by said multivibrator wave to produce pulses of constant frequency and for another adjustment of said adjusting means, said oscillator circuit is controlled by said multivibrator wave to produce pulses of varying frequency.

4. An ultra-high frequency wave generating system comprising a velocity variation oscillating vacuum tube having a repeller anode, and a predetermined anode voltage range within which, only, oscillation will take place, a voltage wave generating circuit which generates a plurality of recurring different wave pulse trains at substantially different voltage levels, the minimum difference in voltage level between successive ones of said plurality of different wave pulse trains being at least one-half of the said voltage range within which oscillations will take place, the output of said generating circuit being connected to said repeller anode, means for applying any one of a like plurality of fixed voltage biases of different voltage levels to said repeller anode said last-stated fixed voltage levels being each proportioned to render a different one only of said plurality of wave pulse trains effective to control the oscillation of said oscillating vacuum tube.

EDWARD W. HOUGHTON.

REFERENCES CITED

The following references are of record in the file of this patent:

UNITED STATES PATENTS

| Number | Name | Date |
| --- | --- | --- |
| 2,287,925 | White | June 30, 1942 |
| 2,337,214 | Tunick | Dec. 21, 1943 |
| 2,404,568 | Dow | July 23, 1946 |
| 2,417,286 | Bartels | Mar. 11, 1947 |
| 2,475,074 | Bradley et al. | July 5, 1949 |